No. 843,906. PATENTED FEB. 12, 1907.
S. T. MURCHIE.
CLAMP COLLAR FOR SHAFTING.
APPLICATION FILED JAN. 4, 1906.
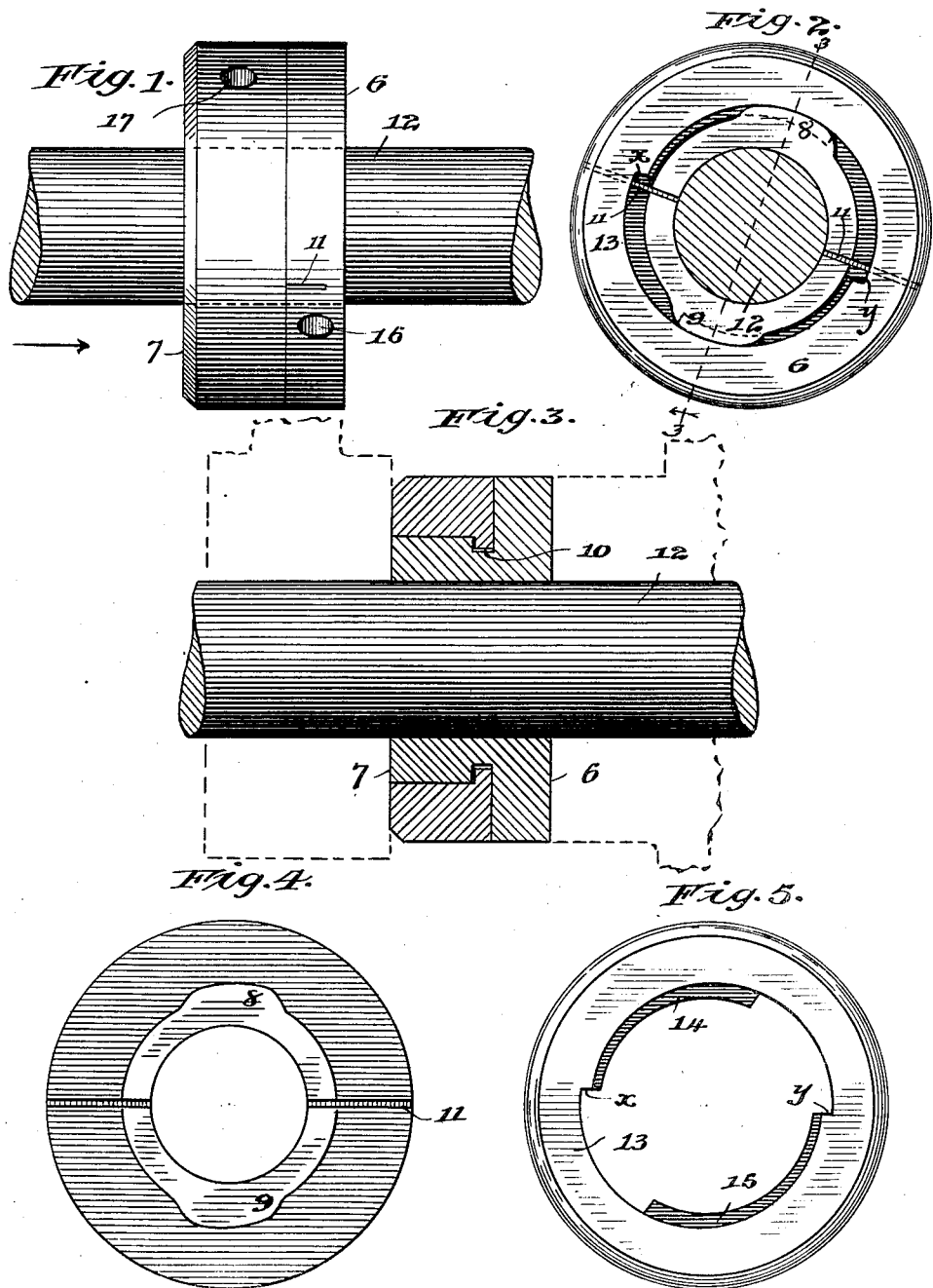

UNITED STATES PATENT OFFICE.

SYLVANUS T. MURCHIE, OF KAUKAUNA, WISCONSIN, ASSIGNOR OF ONE-HALF TO LUCIUS G. FISHER, OF CHICAGO, ILLINOIS.

CLAMP-COLLAR FOR SHAFTING.

No. 843,906.      Specification of Letters Patent.      Patented Feb. 12, 1907.

Application filed January 4, 1906. Serial No. 294,623.

*To all whom it may concern:*

Be it known that I, SYLVANUS T. MURCHIE, a citizen of the United States, a resident of Kaukauna, Outagamie county, Wisconsin, have invented certain new and useful Improvements in Clamp-Collars for Shafting, of which the following is a specification.

In the erection of shafting and the mounting of loose pulleys thereon, as well as in many kinds of machinery, it is common to employ collars which are secured to a shaft or bearing for the purpose of positioning loose pulleys and the like and to prevent endwise movement of the shafting. These collars are most commonly held upon the shaft by means of set-screws, and such set-screws are objectionable because of their liability to catch the clothing of operators, and as the shafting frequently revolves at high speed this is a frequent source of accidents. Various expedients have been attempted for securing such collars without resort to set-screws or other projecting securing devices, among such expedients being internal wedges, taper screws, and the like. None of these expedients which are known to me have proven satisfactory, and, so far as I know, none of them are in successful operation, and hence the set-screws are the almost universal means employed at this time for holding the collars, and various devices are employed for covering the heads of these set-screws and the avoidance of the danger incident to their projection. Among such protecting devices may be mentioned split wooden clamps, which encircle the collar and are chambered to receive the head of the set-screw, which is a very objectionable method on account of the increased size of the original collar and because it is necessary to remove and unclamp the covering in order to change the collar. Sometimes flanged collars are employed, which flanges project beyond the head of the set-screw whereby the collar is secured to the shaft. Sometimes set-screws are employed whose heads are countersunk, but they can only be tightened or loosened by means of a screw-driver, which is not sufficiently powerful to make a secure fastening.

My invention is designed to supply a simple means for securing a clamp-collar to shafting which shall not only afford secure fastening, but which shall also avoid any projecting parts or members which would render the fastening dangerous or otherwise objectionable.

My invention may be embodied in various structural forms, but it preferably comprises a clamp-collar which is provided with a lateral flange capable of being compressed or gripped upon the shaft and an annular cam member coöperating with the compression-flange and capable of rotation thereon, so as to securely clamp the collar upon the shaft.

Broadly stated, my invention comprises a two-part clamp-collar, said parts having relative rotation, one of the parts being provided with a compression member and the other with means for effecting such compression.

I have shown my invention as applied to a shaft, indicating on the shaft the base of a hanger and the hub of a pulley.

In the accompanying drawings, Figure 1 is an elevation showing my improved collar applied to a broken section of shafting. Fig. 2 is a side elevation of the collar looking in the direction indicated by the arrow of Fig. 1. Fig. 3 is a sectional view of the clamp-collar on the line 3 3 of Fig. 2. Figs. 4 and 5 are elevations of the two parts of the clamp-collar separated from each other.

In the drawings, 6 represents the collar, which is provided with a lateral flange 7, the exterior surface of which carries two raised bosses 8 and 9, which are concentric to the axis of the shaft. Grooves are formed at the base of these bosses or enlargements 8 and 9, as indicated at 10, Fig. 3. A transverse slot is formed through the body of the flange and may also be extended into the substance of the collar, as indicated at 11, Fig. 4. The slotting of the flange and of the collar enables the former to be slightly compressed about the shaft 12. To effect this compression, I employ a cam-ring 13, which is provided with internal lips or narrow flanges 14 15, the spaces between the ends of those lips being wide enough to permit the cam-ring to be slipped onto the compression-flange over the hubs 8 and 9, while the lips 14 and 15 serve to hold the cam-ring in position after the latter is turned slightly, so as to move the apertures out of alinement with the hubs. The perimeter or internal portion of the cam-ring is constructed to afford two cam-surfaces, said surfaces converging from the points *x* and *y* toward the axis of the cam-ring. These cam-surfaces bear upon the projecting bosses, and upon the rotation of the cam-ring the split flange is compressed about the shaft, thus effecting a very secure clamping of the collar upon the shaft with a very slight movement. Obviously the surface of the clamping-flange might be symmetrical, or it might be formed reversely eccentric to that of the cams. To effect the relative rotation of the collar and cam-ring, each may be provided with a spanner-hole. (Shown at 16 17, Fig. 1.)

I have shown in dotted lines the base of a hanger at the left of the cam-ring in Fig. 3 and the hub of a loose pulley at the right of the collar in the same figure; but it will be understood that my improved clamp-collar may be applied generally and used in various ways and that my invention is not limited to the indicated uses.

I claim—

1. A clamp-collar comprising two annular members adapted to surround a shaft or bearing, one of said members having a compression part unitary therewith adapted to be clamped upon said shaft or bearing, and the other having cam-surfaces adapted to effect such compression, substantially as described.

2. A clamp-collar comprising two annular members having relative rotation and adapted to surround a shaft or bearing, one of said members having a lateral compression part unitary therewith adapted to be clamped upon said shaft or bearing, and the other member having internal cam-surfaces adapted to effect such compression, substantially as described.

3. A clamp-collar comprising two annular members having relative rotation and adapted to surround a shaft or bearing, one of said members having a longitudinally-slotted lateral flange unitary therewith adapted to be clamped upon said shaft or bearing, and the other member having internal cam-surfaces adapted to effect such compression, substantially as described.

4. A clamp-collar consisting of two members, one having a lateral flange split to adapt it for compression about a shaft or the like, and provided on its surfaces with bosses or enlargements with grooves at their ends, and a cam-ring having inwardly-projecting lips or shallow flanges to coöperate with said bosses and grooves and cam-surfaces to engage said bosses when rotated whereby to effect the clamping, substantially as described.

5. In a clamp-collar, the combination of a collar member having a lateral compression-flange slotted to permit contraction thereof, bosses or enlargements on the periphery of said flange, a cam-ring having internal retaining-flanges to coöperate with grooves in said bosses, and cam-surfaces to coöperate with the peripheries of the bosses whereby to effect the clamping, substantially as described.

SYLVANUS T. MURCHIE.

Witnesses:
C. C. LINTHICUM,
FREDERICK C. GOODWIN.